(12) United States Patent
Guetta et al.

(10) Patent No.: US 8,970,374 B2
(45) Date of Patent: Mar. 3, 2015

(54) INTRUSION WARNING SYSTEM

(75) Inventors: Avishay Guetta, Rehovot (IL); Doron Korngut, Modi'in (IL); Gil Blai, Ramat Gan (IL)

(73) Assignee: Shilat Optronics Ltd, Rehovot (IL)

( * ) Notice: Subject to any disclaimer, the term of this patent is extended or adjusted under 35 U.S.C. 154(b) by 726 days.

(21) Appl. No.: 12/988,321

(22) PCT Filed: Apr. 16, 2009

(86) PCT No.: PCT/IL2009/000417
§ 371 (c)(1),
(2), (4) Date: Oct. 17, 2010

(87) PCT Pub. No.: WO2009/144707
PCT Pub. Date: Dec. 3, 2009

(65) Prior Publication Data
US 2011/0043806 A1 Feb. 24, 2011

Related U.S. Application Data

(60) Provisional application No. 61/124,315, filed on Apr. 17, 2008, provisional application No. 61/202,689, filed on Mar. 27, 2009.

(51) Int. Cl.
*G08B 13/18* (2006.01)
*G01C 3/08* (2006.01)

(52) U.S. Cl.
USPC ........... 340/555; 340/556; 340/557; 356/401; 356/403

(58) Field of Classification Search
USPC ......... 340/541, 522, 552, 555, 565, 584, 587, 340/573.1, 435, 557, 556; 250/205, 221, 250/228, 338.1, 341.1, 342; 356/4.01, 4.03, 356/4.04, 338; 382/115, 118, 103, 218; 342/70
See application file for complete search history.

(56) References Cited

U.S. PATENT DOCUMENTS 3,987,428 A   10/1976   Todeschini
4,065,778 A   12/1977   Harvey
(Continued)

FOREIGN PATENT DOCUMENTS

WO   2004/008403 A2   1/2004

OTHER PUBLICATIONS

International Search Report and Written Opinion, dated Aug. 28, 2009, in corresponding PCT application PCT/IL2009/000417.
(Continued)

*Primary Examiner* — Van T. Trieu
(74) *Attorney, Agent, or Firm* — Fourth Dimension IP; Daniel Feigelson

(57) ABSTRACT

A system for detecting intrusion across a surface, comprising a plurality of light sources projecting an array of illuminating beams along different optical paths in the surface and a detector array system directed such that it detects along a plurality of fields of view in the surface, illumination reflected from the illuminating beams. A signal processing system detects changes along the array of fields of view, in the reflected illumination level detected by the detector system. An increase greater than a predefined level in the reflected illumination level from any field of view provides an indication of an intrusion across the surveilled surface along that field of view, at the crossing point of the direction of that field of view with the optical path whose illuminating beam generated the increase in reflected illumination from that field of view.

30 Claims, 10 Drawing Sheets

(56) References Cited

U.S. PATENT DOCUMENTS

| | | | |
|---|---|---|---|
| 4,734,575 | A | 3/1988 | Wagli |
| 4,949,074 | A | 8/1990 | D'Ambrosia |
| 5,149,921 | A | 9/1992 | Picado |
| 5,548,404 | A | 8/1996 | Kupershmidt |
| 5,627,511 | A * | 5/1997 | Takagi et al. ............... 340/435 |
| 5,877,688 | A * | 3/1999 | Morinaka et al. ............ 340/584 |
| 6,317,040 | B1 | 11/2001 | Ikeda |
| 6,718,049 | B2 * | 4/2004 | Pavlidis et al. .............. 382/115 |
| 6,828,546 | B2 * | 12/2004 | Reime ........................... 250/221 |
| 7,076,088 | B2 * | 7/2006 | Pavlidis ........................ 382/118 |
| 7,250,605 | B2 * | 7/2007 | Zhevelev et al. ............. 250/353 |
| 7,440,620 | B1 * | 10/2008 | Aartsen ......................... 382/218 |
| 7,589,825 | B2 * | 9/2009 | Orchard et al. .............. 356/4.03 |
| 7,939,794 | B2 * | 5/2011 | Rains et al. .................. 250/228 |
| 8,222,584 | B2 * | 7/2012 | Rains et al. .................. 250/205 |
| 2011/0058167 | A1 * | 3/2011 | Knox et al. ................... 356/338 |

OTHER PUBLICATIONS

Extended Supplementary Search Report issued on Aug. 10, 2012 by the EPO, in corresponding EP application No. 09754326.8.

* cited by examiner

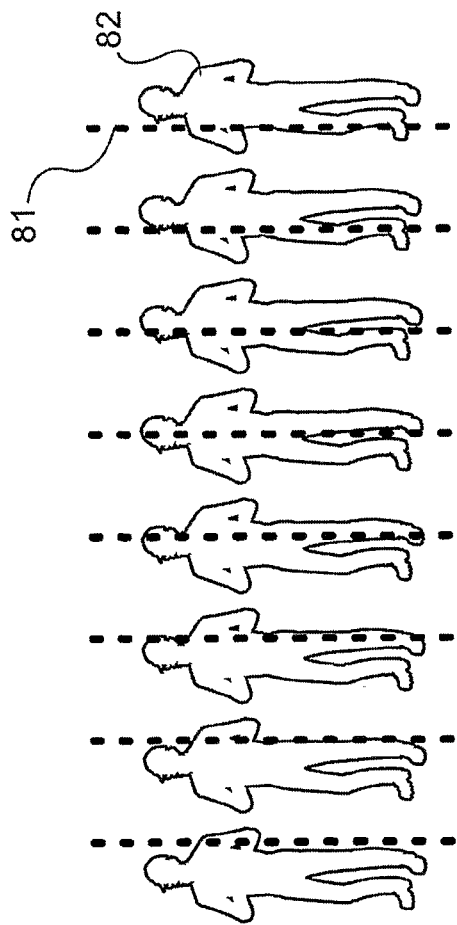
FIG. 8B
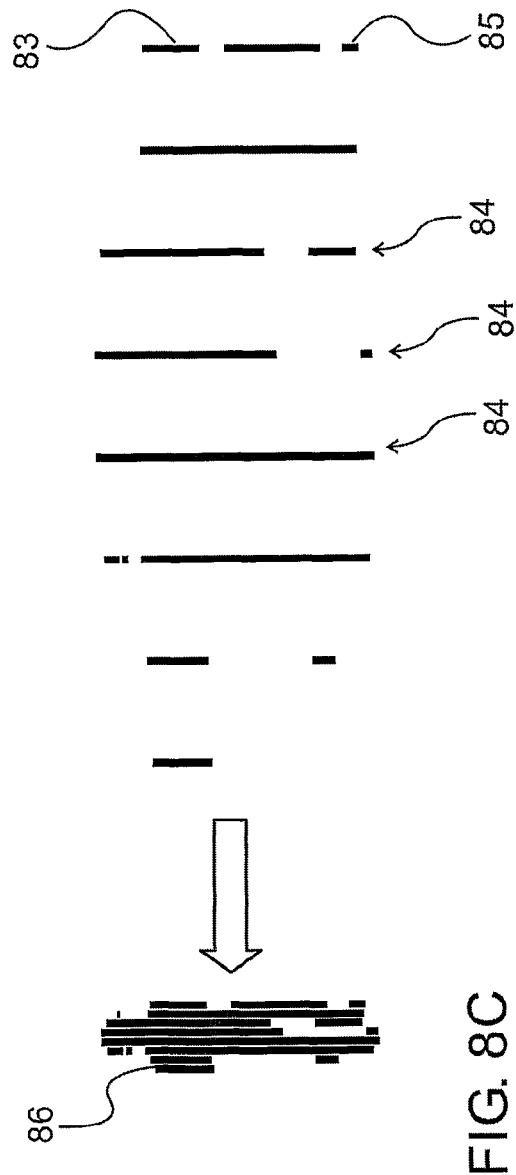
FIG. 8C
FIG. 8A
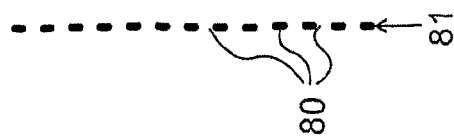

INTRUSION WARNING SYSTEM

This is a 35 U.S.C. §371 application of PCT/IL2009/000417, filed Apr. 16, 2009, and claims the benefit under 35 U.S.C. §120 of said PCT application, and further claims the benefit under 35 U.S.C. §119(e) of U.S. Provisional Patent Applications U.S. Ser. No. 61/124,315, filed Apr. 17, 2008 and U.S. Ser. No. 61/202,689, filed Mar. 27, 2009. The contents of these priority applications are incorporated herein by reference.

The present invention relates to the field of the surveillance of perimeter fences to protect against unauthorized intrusion, especially using optical techniques.

BACKGROUND OF THE INVENTION

Virtual fencing may be used for protecting or securing a separation line against intrusion by unwanted persons or objects in applications where a physical fence is inadequate or impractical, such as over long distances or where the terrain is too rough, or the cost is too high. The virtual fence could be used to protect a border, or the perimeters of an enclosed security area such as an airport, a strategic site, a hospital or university campus, fields and farms, or even private houses and estates The virtual fence should provide warning about the intended intrusion, and should be able to provide information about the location and type of intrusion expected. Current solutions based on video camera imaging, and using signal processing to detect changes in those images, generally have a number of disadvantages which have limited their widespread deployment, especially for border use over long distances, or in regions where the terrain is rough. Such video systems may have high false alarm rates (FAR), limited capabilities for screening irrelevant intrusions such as by animals, significant power consumption, and they could be costly in capital expenses. A system which overcomes at least some of the disadvantages of such prior art systems and methods would therefore be advantageous.

The disclosures of each of the publications mentioned in this section and in other sections of the specification are hereby incorporated by reference, each in its entirety.

SUMMARY OF THE INVENTION

The present disclosure describes new systems for the detection of intrusions over a line to be safeguarded, which combine low capital cost and high sensitivity with a low false alarm rate (FAR). The systems are based on the generation of an array of light beams projected into a two dimensional surface located generally along the line to be secured, and the detection of the distance and height of any spurious reflection from this array of light beams, by means of a detection array, detecting imaged fields of view within the surface along the line to be secured. The surface is most conveniently a plane surface, and will be so addressed henceforth, though this is not intended to limit the described systems to such planar surfaces. Such spurious reflections are assumed to arise from an intrusion object within the plane surveilled. Since the background reflection pattern without any intrusion can be acquired and stored by the system, a change in this detected background pattern can be defined as arising from a spurious reflection, and hence indicative of an intrusion. The angular direction from which the spurious reflection originates is known from the knowledge of which particular detector pixel has detected the spurious reflection signal, since each pixel may generally be directed to monitor a different field of view. The longitudinal position along the line of detection from which the spurious reflection is generated is known, if the particular beam which resulted in that reflection is also known. If the differently oriented beams are identifiable from each other in some way, then the illumination beam which caused the reflection detected can be determined, thus defining the position of the spurious reflection within the plane at the crossing point of the beam direction and the direction of that field of view in which a change in the reflected illumination beam is detected. The beams can be identified by projecting them sequentially according to a predetermined timed sequence, and relating the time of detection at the pixel to that predetermined timed sequence, such that the particular transmitting beam which generated the spurious reflection is known. This is a form of time division multiplexing whereby each light beam illuminates the area in a separate, known time interval. Alternatively, all of the beams can be activated at the same time, each beam having an identifiable modulation applied to it. The detection circuits are adapted to identify the beam by demodulating the signal detected, and identifying the location of the beam associated with that particular modulation. Alternatively, the beams can be distinguished by providing each with a different wavelength, or a different polarization type or orientation, and determining these characteristics to define the particular beam being detected. Any other devised form of beam identification may also be used without limiting the generality of the method.

Essentially, the system thus operates by detecting a reflection from the crossing point, of an array of illuminating beams with an array of detection fields of view. The array of illuminating beams can be a parallel array directed along the plane to be secured, or it can be an angularly fanned out array directed into the plane from a single position at the edge of the plane. In practice the illuminating beams of the array may be activated sequentially in order to cover the entire area of the plane under surveillance, and the ensuing image pattern of each complete scan compared with a previously recorded background image pattern. Any change in sequential patterns may be interpreted as the introduction of an intrusion. By recording the sequential positions of the detected intrusion, an outline of a moving intruder can be generated. This outline can be analyzed in a signal processing module, in order to determine whether it is a human, a vehicle or just an animal.

A practical method of implementing such a system is by mounting the source of illumination beams and the detector array at spatially separated locations at the edge of the border line plane to be surveilled, such that the parallax between them enables the position of a reflection from within the surveilled plane to be determined. This can be easily achieved, for instance, by mounting them at different heights on the same pole or stake. A focusing objective lens may be used to direct the light from different directions onto the linear array of pixels in the detector. The source of illuminating beams may advantageously be a laser diode array.

A number of features of such described systems contribute to reducing the FAR of the systems, in comparison with prior art video imaging systems.

(i) The detection mechanism used is a digital process, and is not dependent on the analog level of signals. This arises because an intrusion is identified by the appearance or not of a reflected signal on a particular pixel. Once the signal is detected as being present, i.e. being above a certain predetermined threshold, its absolute analog level is irrelevant, this defining a digital detection process.

(ii) Fixed background objects such as rocks, the ground, trees, etc do not generate any signal in such a system. Reflections from such fixed background objects are stored in the memory of the image processing system, and are subtracted from the image patterns continuously detected, such that only changes in reflections from this background are registered as potential intrusions.

(iii) The detected field of view is very narrow such that disturbances from outside of this field of view are reduced significantly.

(iv) The detected signal is generally unaffected by changes in the background environment. This is achieved because of the high imaging rate of the linear sensor, reaching up to 40 k lines/sec. Changes in the background environment take place at a much slower rate than this. After every image pattern has been grabbed with the illumination array activated, a reference frame is grabbed without the illumination, in order to determine the background image pattern. This reference pattern is subtracted from the subsequent image pattern. Changes in the background image pattern are so slow compared with the image sampling rate that this background subtraction provides an effectively complete cancellation of the background. The environmental influence on the signal is thus effectively eliminated.

(v) The detection system uses a "normally off" signal. In other words, when there is no intruder, no signal is generated. Such a normally off system provides more affirmative detection of an intrusion than, for instance, a video camera system, where detection is dependent on "normally on" signals.

(vi) A positive intrusion detection is based on the averaging of a very large number of sensor signals. The illuminating array may be very dense, with no more than a few centimeters between neighboring light beams, and the illumination cycle rate may be very high. Consequently, an intrusion of an object the size of a person is associated with tens or even hundreds of positive signal events, each event arising from reflections from different parts of the intruder.

(vii) The signal to noise ratio of the detector is high since the detector is a linear array, which has significantly better sensitivity and lower noise than a 2-D array image sensor, and the region covered is narrow and thus generates less background noise. A relatively low power light source can therefore be used to provide adequate illumination to generate strong reflection signals.

(viii) Reflections occurring from locations outside of the range of interest can be filtered out by the image processing module of the system. This reduces the chances of false alarms by reducing the total sum of information processed by the system.

(ix) The image processing software has only to distinguish between profiles of different intrusion objects, unlike prior art video-based intrusion detection systems which need to process a complete frame image to detect the form of the intruder. The differences between humans, animals, birds, vehicles etc. can thus be determined more positively and rapidly than such prior art systems, thus providing a lower FAR.

The most effective manner of implementing such systems to cover optimum detection sensitivity and position discrimination is by the above described use of an array of illuminating beams and a crossing array of detector fields of view. However, it is to be understood that, where the terrain so enables, simpler systems can also be implemented using a single illuminating beam and an array of detector fields of view. In this case, the crossing points are those of a single line with the array of detector fields of view. Alternatively, use can be made of an array of illuminating beams with a single detector field of view, in which case the crossing points are those of the single line of the detector field of view with the array of illuminating beams. In either of the latter two cases, the single line should optimally be directed at the height where the intrusion is most likely to be detected, such as at mid-body height for detection of a human intruder.

Furthermore, the various systems of this disclosure have been described generally in terms of the detection of "an intrusion" or "an intruder" over the perimeter line of a region to be safeguarded, and has thuswise been claimed. However, it is to be understood that this terminology is not intended to limit the claimed invention strictly to the detection of unwanted personnel or objects, but is so used as the most common application of such systems of this disclosure. The term intrusion or intruder detection is therefore also to be understood to include the detection of a change in the presence of any object within the surface being surveilled by the system, whether the "intrusion" of this object is being detected for warning purposes, or whether for positive detection purposes. Examples of the latter use could include, for instance, the detection of vehicles on a highway sorted according to lane, or the counting of wild animals in motion across a region, or any other remote spatial detection task suited to such systems. In this respect, the present disclosure describes what can be generically termed an Optical Detection and Ranging System, or ODRS.

In one example implementation of the presently claimed system for detecting intrusion, the system comprises:
(i) at least one source projecting an array of illuminating beams along different optical paths,
(ii) a detector system directed such that it detects in an array of fields of view, illumination reflected from the illuminating beams, and
(iii) a signal processing system adapted to detect changes in the array of fields of view, of the reflected illumination level detected by the detector system, wherein an increase greater than a predefined level in the reflected illumination level from a field of view provides an indication of an intrusion in the field of view, at the crossing point of the field of view with the optical path whose illuminating beam generates the increase in reflected illumination from the field of view.

In such a system, the illuminating beams projected along different optical paths may be distinguished by beam identifying features, such that the spatial position of the crossing point at which an increase in the reflected illumination is revealed is known by determining the beam identifying feature of the reflected illumination detected in the field of view. This spatial position of the crossing point at which an increase in the reflected illumination is detected may be known by determining both the beam identifying feature of the reflected illumination detected and the field of view in which the change is detected. Furthermore, according to different exemplary implementations, the beam identifying feature may be any one of:
(i) the point in time at which the illuminating beam is projected along one of the different optical paths,
(ii) a modulation feature applied differently to illuminating beams projected along different optical paths,
(iii) the wavelengths of the illuminating beams projected along different optical paths, or
(iv) the nature of the polarization of the illuminating beams projected along different optical paths.

In other exemplary implementations of the above described systems, the array of illuminating beams may advantageously be aligned generally collinearly with the array of fields of view, such that the system provides the indication of an intrusion across a curtain-like detection plane, this plane containing the array of illuminating beams and the array of fields of view.

Furthermore, in any of the above described exemplary systems, the array of illuminating beams may be a plurality of parallel beams, or a plurality of angularly diverging beams. In the latter case, the plurality of angularly diverging beams may be projected from a single source whose beam is angularly scanned. Additionally, the array of illuminating beams may be projected along different paths in a predetermined sequence, and the changes in the light level detected by the detector system are then changes determined between successive sequences.

Such systems may further comprise at least one focusing element disposed to direct light reflected from different fields of view into the detector system. In yet other implementations, the at least one source may comprise a plurality of light sources each directing its own illumination. In such a case, the plurality of light sources may be a linear array. Alternatively, the at least one source may comprise a single source whose output is scanned angularly to generate the array of illuminating beams. Furthermore, in any of these implementations, the illuminating beams may be either visible, ultra-violet or infra-red beams.

Other implementations may further involve exemplary systems such as described above, and in which each of the fields of view is distinguished by means of detector elements adapted to detect illumination originating from at least one field of view, and the crossing point is determined by knowledge of which of the detector elements is associated with that field of view and which of the array of illuminating beams gives rise to the increase in the reflected illumination detected by the detector element.

Furthermore, according to yet another implementation of such systems, the signal processing system may be further adapted to detect a decrease larger than a second predetermined level, of a reflected illuminating beam originating from another field of view, essentially simultaneously with the increase greater than a predetermined level in the reflected illumination originating from the first field of view, such that the combination of the increase and the decrease in the reflected illumination beams provides an indication of a suspected intrusion across the surface at the crossing point of the field of view with the path whose reflected illumination shows the increase.

According to yet further implementations of the above described systems, the system may be rotated angularly such that it provides an indication of an intrusion in a plurality of directions of fields of view. In this case, the system provides three-dimensional information regarding the location of the intrusion.

As an alternative to the last described implementations, three-dimensional information regarding the location of the intrusion can be provided by adapting the at least one source projecting an array of illuminating beams such that it is scanned in a direction generally perpendicular to the direction of the array of illuminating beams, and utilizing a two dimensional detector array directed such that different columns of the detector array detect the array of illuminating beams reflected from fields of view in directions generally perpendicular to the direction of the array of illuminating beams.

Yet other implementations perform a method for detecting intrusion, the method comprising:
(i) projecting illumination along a plurality of optical paths,
(ii) detecting in an array of fields of view, illumination reflected from the plurality of optical paths, the intersection of the plurality of optical paths with the array of fields of view defining crossing points, and
(iii) revealing an increase greater than a predetermined level in the reflected illumination originating from any of the crossing points, wherein an increase greater than the predetermined level in the reflected illumination revealed at a crossing point provides an indication of an intrusion at the crossing point.

In such a method, the illumination projected along different optical paths may be distinguished by a beam identifying feature, such that the spatial position of the crossing point at which an increase in the reflected illumination is revealed is known by determining the beam identifying feature of the reflected illumination detected in the field of view. In such a method, the spatial position of the crossing point at which an increase in the reflected illumination is revealed may be known by determining both the beam identifying feature of the reflected illumination detected and the field of view in which the change is detected.

Furthermore, according to different exemplary implementations of these methods, the beam identifying feature may be any one of:
(i) the point in time at which illumination is projected along one of the plurality of optical paths,
(ii) a modulation feature applied differently to illumination projected along different ones of the plurality of optical paths,
(iii) the wavelength of the illumination projected along different ones of the plurality of optical paths, or
(iv) the nature of the polarization of the illumination projected along different ones of the plurality of optical paths.

Furthermore, in any of the above described methods, the plurality of optical paths may be laterally distinguished or angularly distinguished. Additionally, the illumination projected along different paths may originate from a plurality of sources, or from a single angularly scanned source.

Still other example implementations involve a method as described above, further comprising the step of aligning the plurality of optical paths generally collinearly with the array of fields of view, such that the method provides the indication of an intrusion across a curtain-like detection plane containing the plurality of optical paths and the array of fields of view.

The crossing points may be predefined to eliminate regions where spurious signals are expected. Additionally, the illuminating beams may be any of visible, ultra-violet and infra-red beams.

Other implementations may further involve exemplary methods such as described above, and in which each of the fields of view may be distinguished by means of detector elements adapted to detect illumination originating from the fields of view, and the crossing point from which the reflected illumination originates is determined by knowledge of which of the detector elements is associated with that field of view and which of the plurality of illuminating beams gives rise to the increased reflected illumination detected by the detector element.

Furthermore, according to yet another implementation, such methods may further comprise the step of determining a decrease larger than a second predetermined level, of reflected illumination originating from another of the crossing points, essentially simultaneously with the increase above a predetermined level in the reflected illumination originating from the first crossing point, wherein the combination of the increase and the decrease in the reflected illumination provides an indication of a suspected intrusion across the surface at the crossing point where the increase in the reflected illumination is determined.

Any of the above described exemplary methods may, further comprise the step of angularly rotating the plurality of optical paths such that it provides an indication of an intrusion in a plurality of directions of fields of view. In such a method, three-dimensional information regarding the location of the intrusion is provided.

As an alternative to the last described method, three-dimensional information regarding the location of the intrusion can be provided by any of the described methods previous to the last method, and comprising the further step of scanning the illumination projected along a plurality of optical paths in a direction generally perpendicular to the direction of the plurality of optical paths, such that the illumination reflected from the array of fields of view is detected in two dimensions.

According to further exemplary implementations, the presently claimed system for detecting intrusion may comprise:
(i) a source projecting an illuminating beam along an optical path,
(ii) a detector system directed such that it detects in an array of fields of view, illumination reflected from the illuminating beam, and
(iii) a signal processing system adapted to detect changes in the array of fields of view, of the reflected illumination level detected by the detector system, wherein an increase greater than a predefined level in the reflected illumination level from a field of view provides an indication of an intrusion in that field of view, at the crossing point of the field of view with the optical path.

According to another alternative exemplary implementation, the system for detecting intrusion may comprise:
(i) at least one source projecting an array of illuminating beams along different optical paths,
(ii) a detector system directed such that it detects in a field of view, illumination reflected from the illuminating beams, and
(iii) a signal processing system adapted to detect changes in the field of view, of the reflected illumination level detected by the detector system,
wherein an increase greater than a predefined level detected in the reflected illumination level from a field of view provides an indication of an intrusion in that field of view, at the crossing point of the field of view with the optical path whose reflected illumination shows the increase.

BRIEF DESCRIPTION OF THE DRAWINGS

The presently claimed invention will be understood and appreciated more fully from the following detailed description, taken in conjunction with the drawings in which:

FIGS. 8A to 8C illustrate a method of intruder typing, using the light beam fan of FIG. 4;

DETAILED DESCRIPTION

Figure 1:
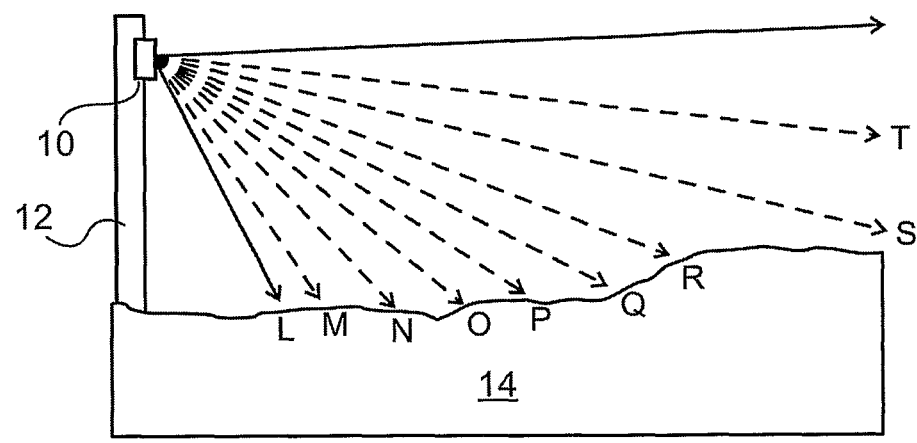
FIG. 1 illustrates schematically a side view of the covering configuration of a linear sensor of the type used in the presently described border surveillance system.

Reference is now made to FIG. 1, which illustrates schematically a side view of the terrain 14 covering configuration of a linear sensor of the type used in the presently described system. The sensor 10 may be suitably mounted on stakes or poles 12, and is positioned such that it looks along the line or border to be secured against intrusion. These stakes can either be support stakes of a real fence, in which case they detect the approach of an intruder at the fence, or they can be simply stakes positioned at regular intervals along the line to be secured, without any intervening physical fence, in which case they constitute a virtual fence. The linear sensor may be mounted essentially vertically, and individual pixels of the sensor are adapted to image different angular field of view directions of the area in front of the sensor, such as by, means of an imaging lens, as will be shown in FIG. 3 below. Each of these different angular directions therefore covers a different zone in front of the sensor, as shown by the regions L to T in FIG. 1. Zones L to R image right up to the ground of the terrain 14 in front of the sensor, while S and T image the surveilled area at such an angle that any reflection from the ground may be from too far away and too weak to be detected significantly by the pixels imaging those sectors.

Figure 2:
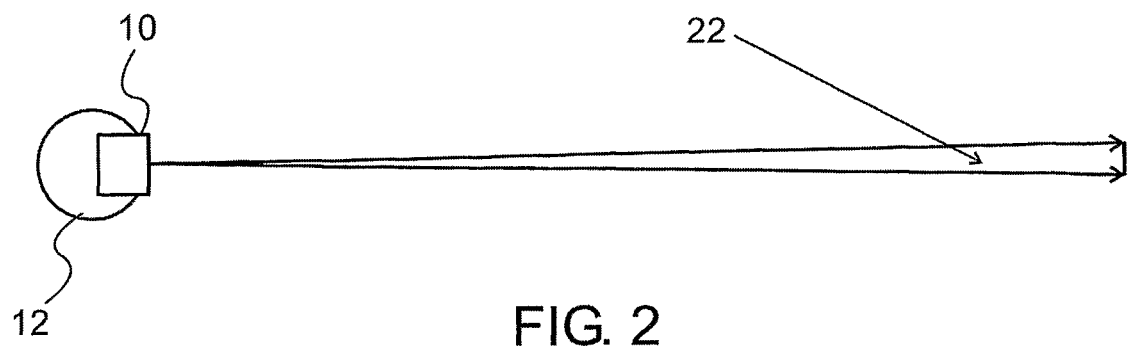
FIG. 2 shows the top view of the linear sensor of FIG. 1.

Reference is now made to FIG. 2, which shows the plan view of the linear sensor 10 of FIG. 1, showing a sensor having a narrow coverage angle 22 in the lateral direction. The sensor array thus generates a virtual, curtain-like sensing wall reaching out along the line to be secured. Although the plan view of FIG. 2 shows a planar intrusion detection surface, located vertically out of the plane of the drawing, which may be thought of as being the most convenient form of intrusion detection surface to generate, it is to be understood that the surface does not have a planar, but can be curved or otherwise shaped according to the optical setup of the sensor array and its associated optics.

Figure 3:
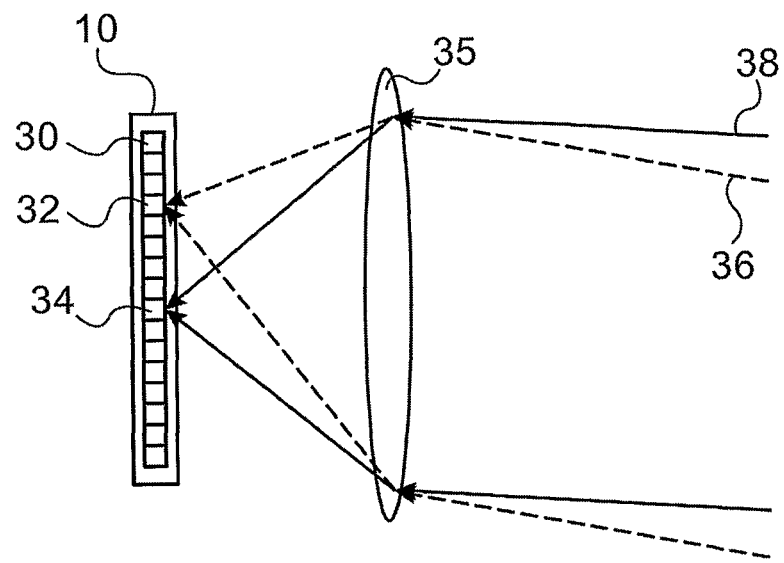
FIG. 3 shows the use of an imaging lens with the components of FIG. 1.

Reference is now made in FIG. 3, which shows the use of an imaging lens 35 to focus the light from different directions along the surveilled line onto different pixels 30 of the linear image sensor 10. Each angular direction increment is generally imaged onto its own sensor pixel, such that each sensor pixel essentially images a different incremental field of view along the surveilled line. Thus, in the example of FIG. 3, light coming from direction 36 is imaged onto pixel 32, while light coming from direction 38 is imaged onto pixel 34. The linear image sensor can be any suitable type, such as a CMOS or a CCD linear array.

The described system also comprises an array of light sources to illuminate the region onto which the sensors are directed. In order to avoid detection by a potential intruder, the light sources may be in the near infrared region, such as in the range 700 to 1100 nm, or any other region not detectable by the human eye. If it is desired to prevent detection also by standard TV cameras or image intensifiers, then a non-standard IR range can be used, such as the range 1100 to 2000 nm. The array may either be a linear array of light sources, or individual sources directed at the desired zones.

Figure 4:
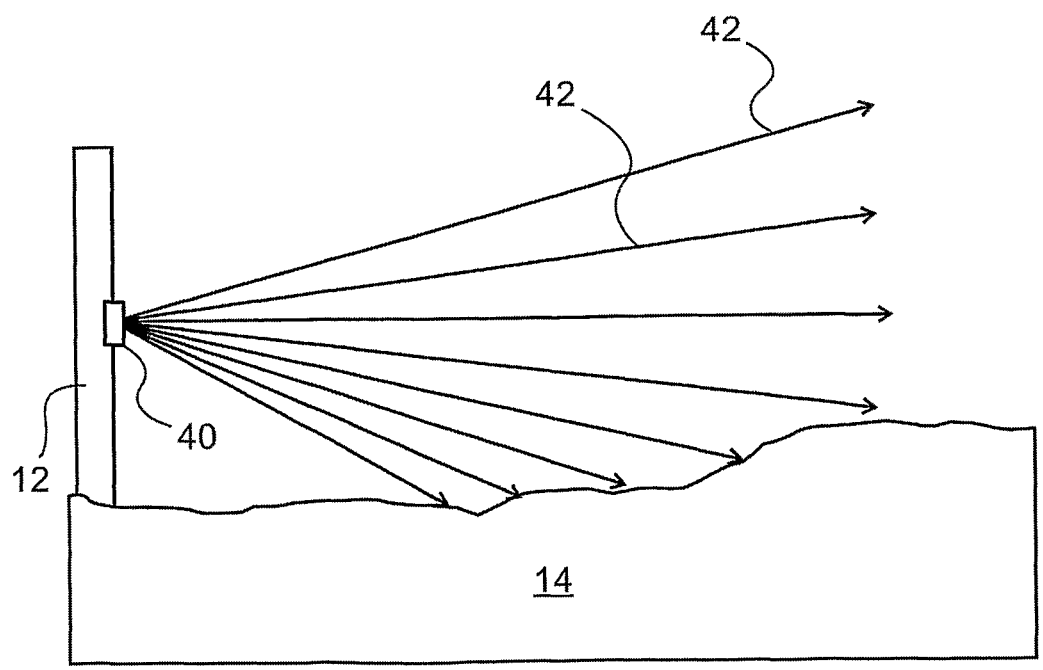
FIG. 4 illustrates schematically a side view of the covering configuration of a linear array of light sources of the type used in the presently described system.

Reference is now made to FIG. 4, which illustrates schematically a side view of the covering configuration of an exemplary linear array of light sources 40 of the type which can be used in the presently described system. Like the sensor array, the light source array 40 may be mounted on one of the perimeter stakes or poles 12 and should be mounted at some distance from the image sensor, such that there is optical parallax between the light emitted from the source array 40, and that sensed by the sensor array. The reason for this parallaxed spacing is explained hereinbelow, in connection with the explanation of FIG. 5. The light source array is positioned such that it illuminates the region along the line to be secured. Each of the individual sources is directed in a different angular direction 42, as shown in FIG. 4, or at a different beam height if the beams essentially form a parallel array, as shown hereinbelow in FIG. 6B, such that each one thus illuminates a different region of the plane in front of the sources. The light diffusely reflected from anything within the illumination plane is detected by the sensor array, and this is the optical mechanism by which the field of view is surveilled for intrusion. Although the illumination array is shown to be projected out in a planar surface, which may be thought of as being the most convenient form of illumination array to generate, it is to be understood that the surface does not have a planar, but can be curved or otherwise shaped according to the optical setup of the sources used and their associated optics, if any.

Figure 5A:
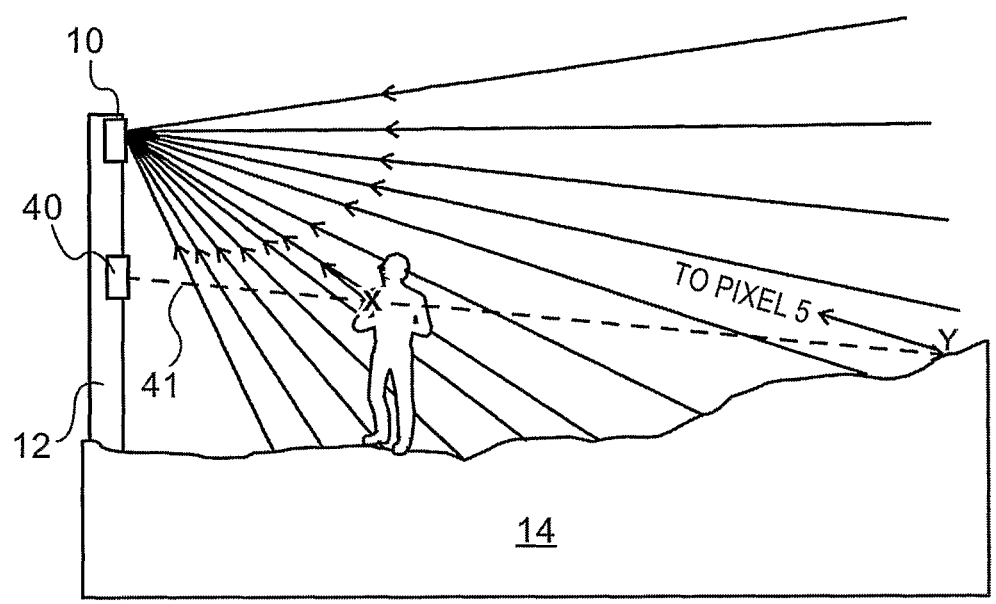
FIG. 5A illustrates schematically the effect of the entry of an intruder into the region under surveillance using a single light beam.
Figure 5B:
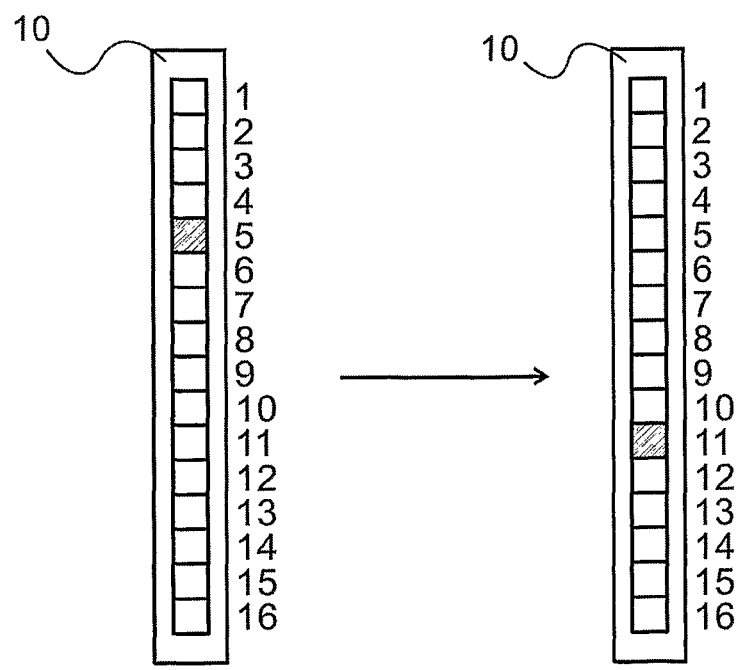
FIG. 5B shows the detection of the light reflected from such an intruder on the pixels of the linear detector array.

Reference now made to FIGS. 5A and 5B, which illustrates the effect of the entry of an intruder into the region of the line under surveillance by the system. In order to simplify the explanation of the system operation, the effect of an intruder on a single light beam 41 is shown in FIG. 5A. When no intruder is present, the light beam 41 strikes the terrain or a static object on the terrain, at point Y, and is reflected onto, for instance, pixel 5 in the sensor array 10 shown in FIG. 5B. When an intruder crosses the surveilled line, the light beam 41 is intercepted, and the light scattered from the ground spot marked Y is prevented from reaching pixel 5, whose signal thus falls to a lower level. On the other hand, the light beam is scattered at point X by the intruder, and because of the above-mentioned parallax effect between the light source and the offset sensor, the scattered light now falls onto another pixel, such as pixel 11 of the sensor array 10, which suddenly detects a substantial increase in signal, above the background level which it received before the intrusion. Thus, a scan of the output of all of the pixels of the sensor array will readily detect a change arising from such an intrusion. Detection can be achieved either by detecting the reduced signal level on a pixel or pixels receiving illumination from the region whose reflected beam is now blocked by the intruder, or by detecting the increased signal level on a pixel or pixels receiving illumination from the reflected beam now appearing by reflection off the intruder, or by simultaneously detecting both the reduced and the increased signal levels on both respective pixels or sets of pixels. The latter arrangement obviously provides the optimum detection mode.

The single source 41 shown in FIG. 5A covers only a single line of the surveilled border line. It would be simple for an intruder to avoid such a single line beam if he could detect it, by ducking under or jumping over it. In order to cover a complete curtain-like plane, it may therefore be preferable to use not just a single beam 41, but an array of sources as described above, each source being directed in a different direction along the surveilled border or fence.

Figure 6A:
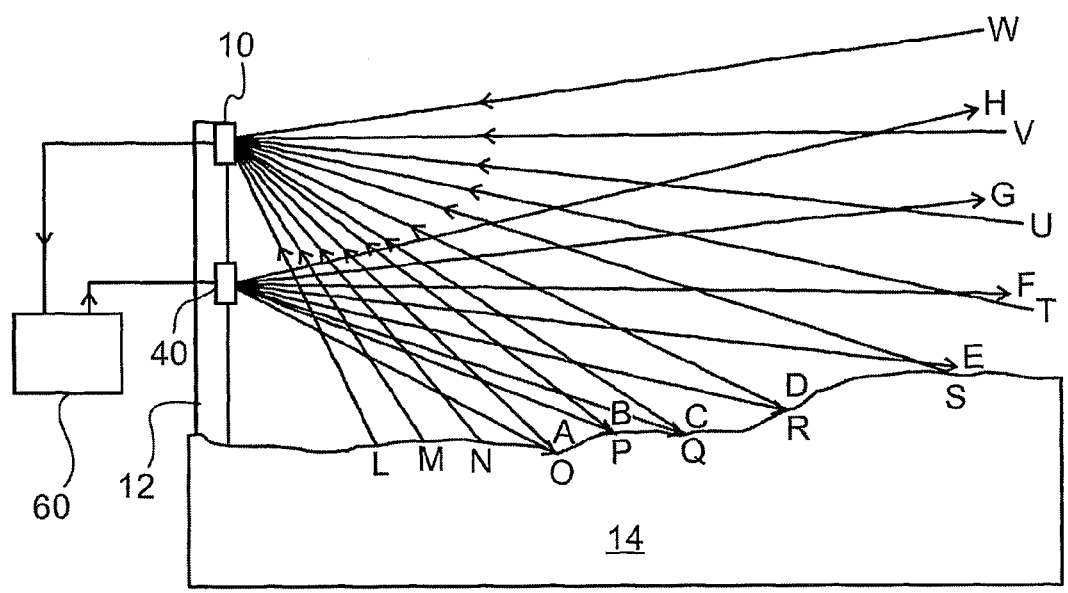
FIG. 6A illustrates schematically a side view of the covering configuration of a complete intrusion detection system using a linear array of light sources and a linear array of sensors.

Reference is now made to FIG. 6A, which illustrates schematically a side view of the covering configuration of such a complete intrusion detection system using a linear array of light sources 40 and a linear array of sensors 10 as described hereinabove. Although in FIG. 6A, and in other drawings of this disclosure, the sensor and illumination sources are shown conveniently located on the same fence pole 12, it is to be understood that this is not an essential requirement of the system. However, they should be closely spaced, and with parallax between them, such that light from the source beams is directed in a predefined manner into the pixels of the sensor array. In FIG. 6A there are shown eight illumination beams labeled A to H, and 12 fields of view of the pixels of the sensor, labeled L to W. There are thus potentially up to 96 crossing points of illumination beams with the sensor pixel fields of view. Because of the imaging lens shown in FIG. 3, the light received from each different direction in the surveilled field of view creates a signal in specific ones of the linear detector array pixels. Thus each field point in the plane along the line under surveillance is focused onto a specific pixel of the linear image sensor 10. This effect is illustrated in FIG. 6A, where the light diffusely reflected by the beams falling on each region of the terrain surface 14 when no intrusion is taking place, is imaged by the imaging lens onto a different pixel. Thus, the reflection of beam A from the terrain is imaged by field of view O of the sensor array, that of beam B by field of view P, and so on. The overall image generated from the pixels of the sensor array thus reflects an image of the situation in the region along the surveilled perimeter. Thus, the combined sensor output provides a signature of the surveilled region when no intrusion is taking place. This in itself could be used as a system for terrain mapping.

On the other hand, referring back now to FIG. 5A, when an intruder enters the field of view, the reflections of illuminating beams impinging on the intruder take place at points in the plane other than on the terrain surface. In effect every crossing point of:

(a) a light beam with
(b) a field of view of a pixel represents an imaged point where an intrusion can be detected, and analysis of changes in the pixel signals at each of these crossing points allows an intrusion to be detected and its position determined, as will be shown hereinbelow. The signal processing and analysis and any other control functions required by the system are performed by the system controller 60.

The particular change in the detected signals of the pixels of the sensor array from its background pattern can be used to determine the distance along the fence at which the intrusion takes place, since the signal from each pixel can be related to the region from which scattering of the light from a particular illumination source takes place. Thus, a look-up table can be generated when the system is deployed, which, for each separate light beam, relates each pixel of the sensor array to the region along the protected line from which the detected light is reflected. Thus for a particular beam, the pixel which detects the reflected beam defines the distance from which the reflection took place. The system thus operates as an Optical Detection and Ranging System (ODRS). Since any changes in the background field topography take place slowly, the system can perform an adaptive learning algorithm that allows it to update the background reference pattern according to these changes. The look-up table may be regenerated periodically by the system controller 60, to recalibrate the system for any such changes.

Since the ODRS detects the presence of an intrusion by detection of discrete stepped changes in the illumination of different pixels, the detection system operates essentially digitally, since it provides output information independently of the analog level of the outputs of different pixels. It is the information related to whether a pixel is illuminated or not that enables the presence of an intrusion to be determined, and not the specific level of illumination on any pixel. This feature has an important effect on the false alarm rate (FAR) of the system. This is unlike prior art video systems which image the whole of the background scene and detect changes thereto, and which are therefore dependent on processing the analog output levels of the camera pixels. In the present ODRS system, on the other hand, the pixel outputs to be processed are digital. This greatly simplifies the signal processing load, leading to a more reliable detection system. The ODRS is thus unique in that it detects simply motion in the surveilled field of view, independently of changes in the color, shade, or other features of the image. In the ODRS, the criteria for an intrusion is not the presence or the absence of a signal on any particular pixel, but rather, the change in the presence or the absence of a signal on any particular pixel.

Referring back to FIG. 6A, if all of the light sources were activated together, the pixels in the sensor array would not know from which source each component of its signal is coming, and the information available would be completely mixed up. It is therefore necessary to differentiate between the signals received on the sensor pixels originating from light scattered from different sources. Separation between different light signals can be performed by any suitable modulation method. One exemplary method is to use time division multiplexing, whereby each light signal illuminates the secured region sequentially in a separate allotted time slot. The linear image sensor captures a different overall image for every sequential light signal emitted, and hence will be able to differentiate between the patterns generated by different illumination beams according to the time of capture of the image pattern. Once a complete signal cycle is performed over all of the individual light sources, a new cycle can begin. The system controller 60 must maintain synchronization between the signals detected from individual pixels, and the light sources being activated at every point of time, in order to perform a meaningful sequential comparison between successive illumination configurations. As an alternative to time division illumination, each illumination source can be identified by some sort of coding, such as a time-dependent or pulse shape dependent, or modulation frequency dependent coding, and the pattern of this code used to determine at each pixel output, from which light source a particular signal originates. Alternatively, the beams can be distinguished optically, such as by their polarization or wavelength.

It is possible to reduce the time taken for each scan of the light sources by the use of selective interrogation of the pixel signals, instead of checking each pixel output for every illumination beam. Referring back to FIG. 6A, there are shown eight illumination beams and 12 fields of view of the pixels of the sensor, such that there are 96 crossing points of illumination beams with the sensor pixel fields of view. Interrogation of the pixel signals at every crossing point would take a certain signal reading and processing time. However not all of the illumination beam optical paths result in meaningful reflections to all of the pixels. Thus, in FIG. 6A, illumination from beams such as A, B, C and D, for instance, would never result in illumination entering pixels related with, for instance, fields of view S, T, U, V and W. Therefore, when such beams are transmitted, there would appear to be no reason to attempt to read signals coming from pixels associated with the fields of view S, T, U, V and W, and reading the signals from such combinations can thus be skipped without losing any meaningful information regarding likely detection of an intrusion. Likewise, illumination from beams closer to the sensor array, such as beams F, G and H, would be reflected by an intruder into pixels related with field of view directions L, M, N and O at points very close to the detection post. This is an area of lower interest for intrusion detection, firstly because the spatial mutual proximity of the crossing points generates redundancy, and also because there may be detection overlap from neighboring poles, making these regions less critical. Therefore such combinations can also be ignored when scanning all of the beam/pixel FoV crossing points. Furthermore, if there is a section within the scanned regions where it is known that authorized "intrusions" can take place, such as for instance a road running through the scanned region, crossing points located within that section can also be ignored during the scanning process. Therefore it is possible by predetermined selection, to limit in each complete cycle of illumination scan, the number of pixels which are interrogated for signal content. This procedure may be used to speed up the scan rate, and/or to lighten the signal processing load.

Figure 6B:
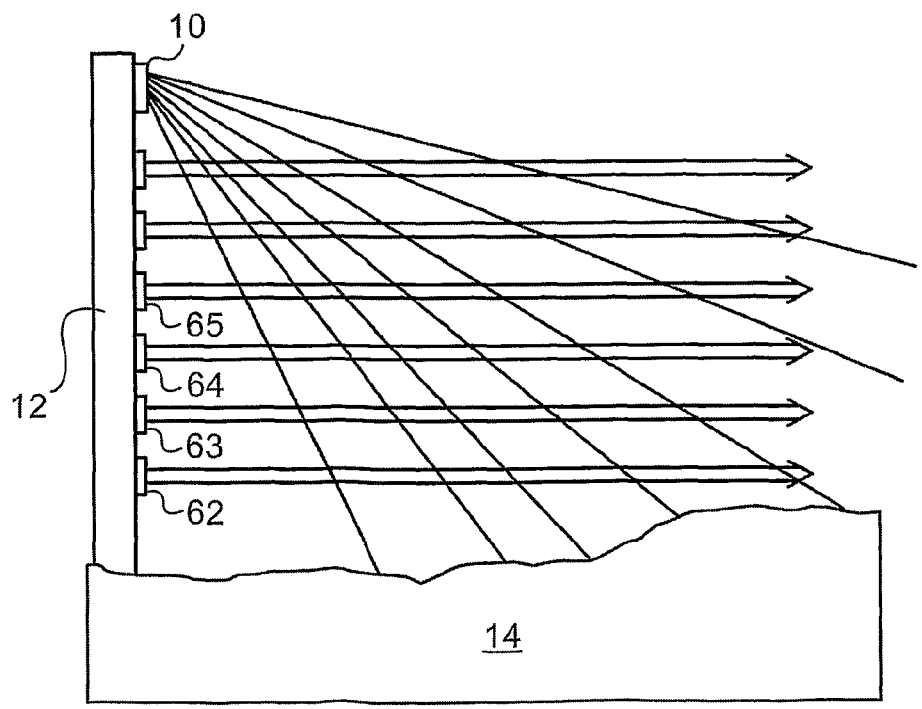
FIG. 6B illustrates an alternative scheme, whereby one of the arrays provides parallel distribution of its fields of view or propagation directions.

FIG. 6A shows a combination of two angularly fanned optical paths, one for the sources and the other for the fields of view of the sensor pixels. Reference is now made to FIG. 6B which illustrates an alternative scheme, whereby one of the arrays is an array providing parallel distribution of its fields of view or propagation directions. In one exemplary implementation of FIG. 6B, the light sources constitute separate laser sources 62, 63, 64, 65, . . . , mounted on the system stake 12, and directing their beams generally parallel to each other out into the region to be surveilled. The sensor 10, on the other hand, has a fanned out, angularly dependent, array of fields of view, like that of the previous examples, such that each pixel field of view generally cuts all of the parallel laser beams. In this way, the intersection points of the parallel laser beams and the fields of view of each pixel provide the grid of detection points used for covering the entire plane in the surveilled area, used for building the entire imaged pattern. This exemplary implementation may have an advantage over the previously described implementations with a fanned out beam of light sources, in that the background image pattern may have a much lower level of reflected light, since most of the beams will continue towards the horizon without inducing any reflections from the ground of the terrain. The background signal will therefore be of a lower level and more uniform, such that signals generated within the region by a real intrusion will be easier to detect. An alternative combination could include an angularly fanned-out array of illuminating beams in conjunction with a parallel array of detection directions, as produced by a series of individual detectors mounted, for instance, along the length of the stakes along the line to be secured. Any such combinations may be used so long as a grid of intersection points is generated between the illuminating beams and the detection directions.

The light sources may advantageously be laser sources in order to provide well collimated beams. The multiple light sources may either be individual independently collimated sources arranged in an array, or a stack, such as a VCSEL array or an individually addressable laser diode array, and whether an angularly or parallel directed array or a single source which is scanned across the angular span which it is desired to illuminate. Scanning may advantageously be performed by a polygon scanner, a galvanometric mirror module, an acousto-optic scanner, or by a MEMS device. In order to distinguish between the light signals emitted in different directions, each individual directional light signal should be coded with its own identifying feature. In the case of a linear array, each emitting source may be modulated with its own unique code. In the case of an angularly scanned single source, the source may be modulated in synchronization with the angle at which the source is directed, such that each direction has its own unique identifying feature.

Figure 7A:
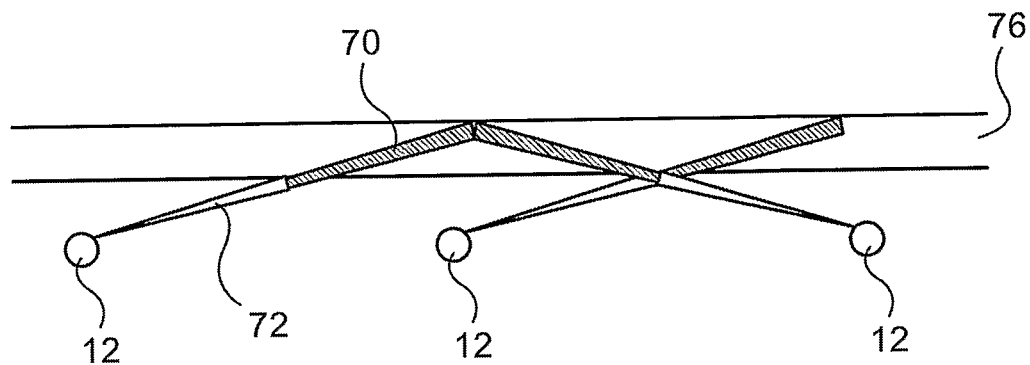
FIGS. 7A and 7B illustrate an exemplary implementation of the system of the present disclosure, to provide surveillance remote from the system components themselves.
Figure 7B:
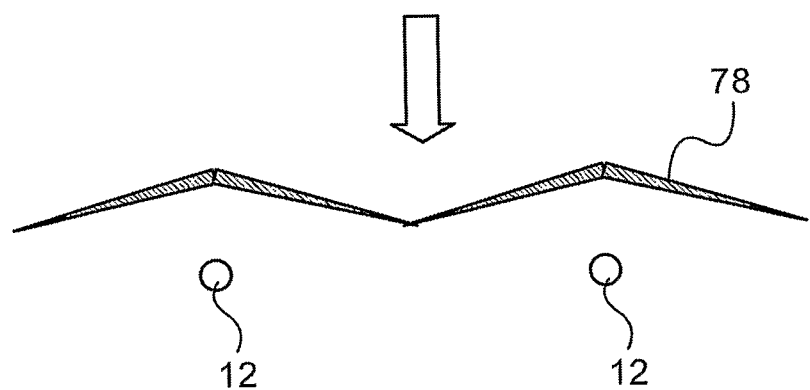

Reference is now made to FIGS. 7A and 7B, which illustrate an exemplary implementation of the system of the present disclosure to provide surveillance of a sensing zone somewhat remote from the fence line itself. This is generally the situation that exists when a perimeter such as a border is to be protected, It may be important to detect intrusion at a specific distance from the border line, in order to prevent a potential intruder from reaching the border line itself. In FIG. 7A there is shown a series of poles 12 along a border to be monitored, each pole having an ODRS system of the type described hereinabove, with illuminator and sensor arrays mounted thereon. Each sensor unit 12 covers a vertical curtain plane, 70 starting at the position of each sensing unit 12 and ending at the maximum sensing distance at which the sensor unit can reliably operate. The zone to be protected 76 is located at a distance from the fence line itself. Responses obtained by the sensor units within the area from the fence line up to the protected region, marked 72 in FIG. 7A, are ignored by the system, and only responses from the protected region 76 outwards towards the detection limit are taken into account. The result, as shown in FIG. 7B, is a "virtual fence" 78 for detecting intrusions into the protected region, as shown by the arrow approaching the virtual fence, and located somewhat remote from the physical position of the border line itself. The distance of this virtual sensing zone from the physical border can be determined by the extent of the region 72 close to the fence, in which intrusions are ignored.

It is important to be able to identify the intruding body, in order to distinguish between intrusion by a suspect item such as a person or a vehicle, and intrusion by an animal or bird, or even motion of tree branches in the wind or an object being blown by the wind. Reference is now made to FIGS. 8A to 8C which illustrates a method of such intruder typing, using the above-described ODRS. From the illustration of the light beam fan in FIG. 4, it is evident that if a vertical line is drawn at any point along the light beam fan, the array of light beams will generate a linear array of light spots 80, called a light spot vector 81, as shown in FIG. 8A. As previously explained, each of these light spots 80 falls within the image field of view of different ones of the pixels in the sensor array, such that light scattered from each spot is distinguished from that scattered from any other spot. When an intruder 82 cuts through a light spot vector 81, the light diffusely reflected from the intruder into the pixels at every point where the intruder cuts the light spot vector results in an effective scan of the intruder, cycle by cycle. As the intruder 82 crosses the light spot vector 81, as shown in FIG. 8B, each sequential cycle of the scanning cycle produces a different sensor output pattern, according to the intruder's position relative to the light spot vector. The right hand section of FIG. 80 then shows the sensor output for different positions of the intruder, the different positions corresponding to those shown in FIG. 8B. Thus, in the rightmost position, where the intruder just enters the light vector, two sections of reflected light are detected, one 83 from the upper arm of the intruder, and another section 85 from his lower extremity. As the intruder progresses across the light vector, different parts of his body generate different signals 84 in the detection array. Finally, as shown on the left hand side in FIG. 8C, all of the separate sequentially timed sensor signals are combined to create a two-dimensional "bit-map" i.e. a black-and-white image, showing the outline shape of the intruder 86 as determined by the crossing of the light spot vector. The image on the left hand side of FIG. 8C has been drawn to show how it is made up sequentially from right to left of the individual sensor outputs shown in the right hand side of FIG. 8C, and for this reason is a mirror image of the intruder shown in FIG. 8B, but this is merely a matter of the order of display of the individual output patterns from the system.

In this respect the ODRS operates in a very different manner to that of a video camera intrusion detection system, where the contrast, color, shade, and other parameters of the foreground and background parts of the image are of importance in activating the detection algorithm. Unlike such prior art video systems, the detection mechanism in the current ODRS uses only changes in the outline shape of the intruder in order to detect his presence, rather than changes in the multiplicity of features which can be determined from a video frame.

Inserting some typical numbers to illustrate the usefulness of this method, for an array of 100 illuminating beams and a pixel reading rate of 20 kHz, the scanning rate of the company illumination array is found to be 200 Hz. Thus, an intruder is scanned 200 times every second, such that for a person passing a particular plane in half a second, his outline is scanned 100 times by such a system. Such a high repetition, multiple scanning effect is capable of very high reliability and is substantially more independent of interference from the background signal than prior art video imaging systems.

Since the detected image is a bitmap of the outline detected, and there is effectively minimal disturbing background signal, a simple image processing algorithm can be used to recognize the intruder shape, the intruder size, the intruder type and other intruder features. Furthermore, since the information is in a bitmap form and not a video frame type, a relatively low data transfer rate can be used in order to transfer the data. Since the illumination scan rate may be at a much faster rate than is required for scanning the intruder moving at a comparatively slow rate, the sensor outputs used to construct the intruder outline may be selected not from every successive cycle, but from periodically selected scanning cycles, such as every 5, 10 or 20 cycles, depending on the scanning rate, and the range of speeds of motion of the intruders to be detected.

Although this described system should be capable of intrusion detection with an FAR considerably superior to that of prior art systems, it is somewhat dependent on the speed of motion of the intruder. Thus a person moving slowly would appear to be fat, while a quickly moving person would appear to be thin. Therefore it would be advantageous to include some method of determining the speed of intrusion, in order to normalize the outline image obtained relative to the intrusion speed. This can be readily achieved by using two slightly separated sensors, and measuring the transit time between them of the intruder outline. However, if the person were to stop during his intrusion path, the system would have difficulty in detecting the intrusion correctly. One method of overcoming this problem could be to include a small angle lateral scanning system, such as ±2°, in each illuminating beam array. This can be readily achieved using a device such as a galvanometric mirror, a rotating scanning polygon, a MEMS mirror, or a piezoelectric scanner. As soon as an intrusion is detected, the small angle scanning system is activated and the illuminating beams scan the intruder and generate an outline bitmap, regardless of his speed of motion and regardless of whether he stops completely or not.

The line array sensors used in the systems of this disclosure provide a further significant advantage over prior art intrusion detection devices using two-dimensional video cameras. This advantage arises because of the frame rate which such video cameras can achieve, as compared with the image scanning rate which a linear pixel array can achieve. A mega- or multi-megapixel camera typically operates at a frame rate of up to around 1 kHz. On the other hand, a CMOS or CCD linear array having typically only 1 to 2 kpixels, operates at a much faster rate, typically at up to 40 k lines per second, such that even when using only half of the signals for detection purposes (alternate signals being used for background determination) a frame rate of up to 20 kHz is readily achievable. Now background changes in the observed field of view of a typical open region, generally take place at frequencies of from a few Hz up to a maximum of about 1 kHz. Branches swaying in the wind, or leaves blowing, may generate image changes of the order of a few Hz up to some tens of Hz. Atmospheric turbulence, on the other hand, can generate image changes of up to 1 kHz. A two-dimensional video camera with a 1 kHz refresh rate will not therefore be able to effectively handle such high frequency background changes, since they change at the same rate as the imaging rate. The system of the present disclosure on the other hand, operating at a refresh rate of up to tens of kHz, is readily available to follow background changes of the order of kilohertz and to cause their cancellation in the image processed, since at such an image refresh rate, nothing in the background can be regarded as changing significantly between one frame and the next, and the only pixel changes detected between frames may be due to intrinsic limitations such as camera dark noise or shot noise. The FAR arising from such background environmental disturbances is thus substantially lower in the system of the present disclosure, than in prior art video imaging systems.

In the detection system described hereinabove, the effect of the background is taken into account by recording a plot of the background without any intruder, and entering the pixel map into a lookup table which defines the background map. This background map comprises the pixel signals of the light reflected from every point in the environment from every light source. Any discrete changes observed in the elements of this background map correspond to changes in the surveilled topography, such as by the entry of an intruder. Since the pixel map is a digital representation, with a predefined threshold level defining whether there has been a change in the signal on a pixel or not, changes in overall lighting such as the sunset or sunrise, or changes in the weather, or cloudiness do not affect the overall ability to detect an intrusion using this pixel map. This thus represents a first level of background cancellation. According to a refinement of this method, another background map can be taken without any of the illumination sources operative, and this background map can be subtracted from the background map with the light sources operating (and without any intrusion present), such that a net background map of the light source illumination of the topography can thus be obtained, without the effect of the background environmental illumination. Such a net background map will be even more sensitive for detecting intrusions than one which includes environmental background effects.

Since the information acquired for detection of an intrusion is based on detection of a large number of signals in different pixels, and coming from different light beams, the system can be adapted to use the coincidence of a predetermined number of positive signal events before deciding that an intrusion has taken place. This multiple event decision assists in reducing the FAR of the system.

As previously mentioned in relation to FIG. 6A, the position of the intruder can be determined by observation of the change in the pixel illumination pattern. For each light beam, the position of the signal received on the sensor array is dependent on the distance of the object from the sensor array, on the distance between the illuminating array and the sensor array, and on the focal length of the imaging lens.

Figure 9A:
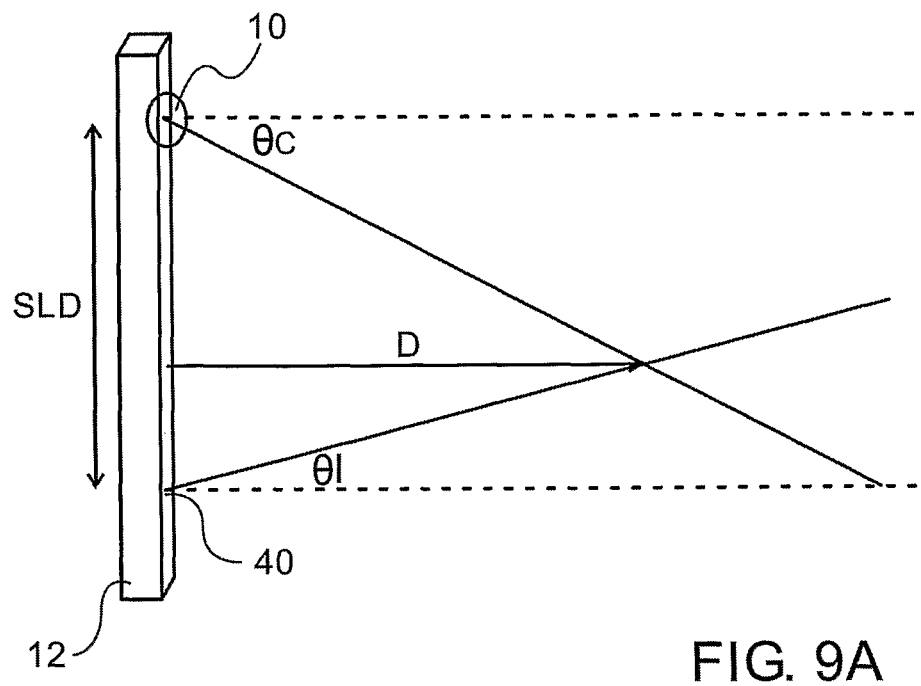
FIGS. 9A and 9B show a quantitative geometric method by which the distance of an intruder position may be measured.
Figure 9B:
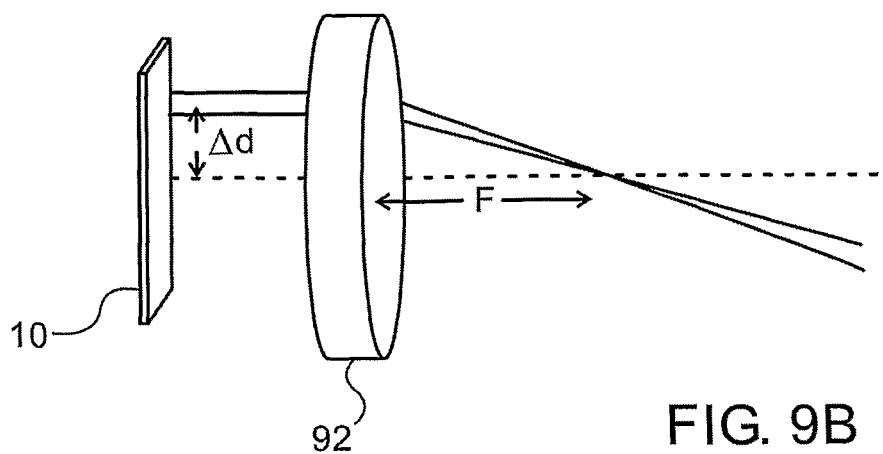

Reference is now made to FIGS. 9A and 9B, which show a quantitative geometrical method by which the intruder position D from the source/detector array position may be measured using this data. In FIG. 9A, there are shown the detector array 10 and the illumination source 40 mounted on the ODRS post 12, with an intrusion at a distance D being detected by reflection of the source light onto the detector array. In FIG. 9B, there is shown the relationship between the focal length F of the detector array focusing lens 92 and the displacement Δd of the illumination on the detector array as a result of the reflection from the intrusion at a distance D, compared to the optical axis reference when there is no intrusion-generated reflection.

To a first approximation the distance D of the intruder from the ODRS is given by the equation:

$$D = F/(\Delta d \times SLD) \quad (1)$$

where:

F is the focal length of the imaging optics;

Δd is the movement of the signal on the pixel array, and is equal to the pixel pitch times the number of pixels through which the pixel illumination moved as a result of the intrusion; and SLD is the distance between the sensor array and the light source array.

The accuracy ΔD with which the intruder range can be determined is given by the equation:

$$\Delta D = D \times bh \quad (2)$$

where bh is the height at the intruder distance of the beam fan entering the width of one pixel.

Figure 10A:
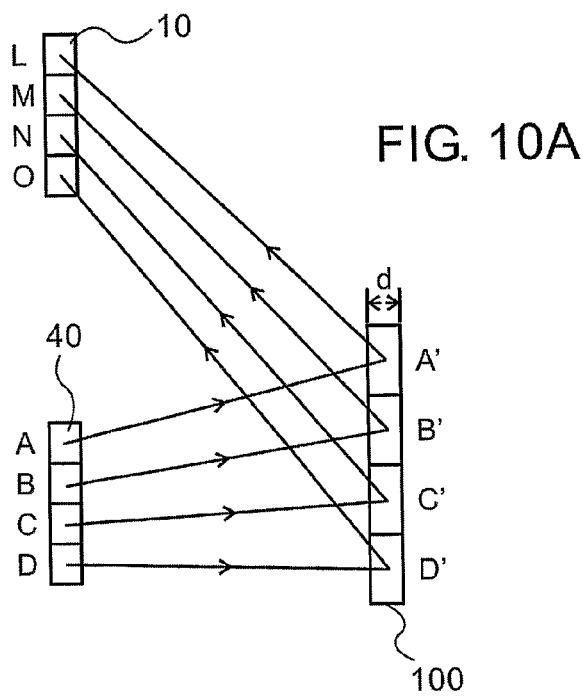
FIGS. 10A to 10C illustrate the effect of misalignment of a light source and a method for overcoming it.
Figure 10B:
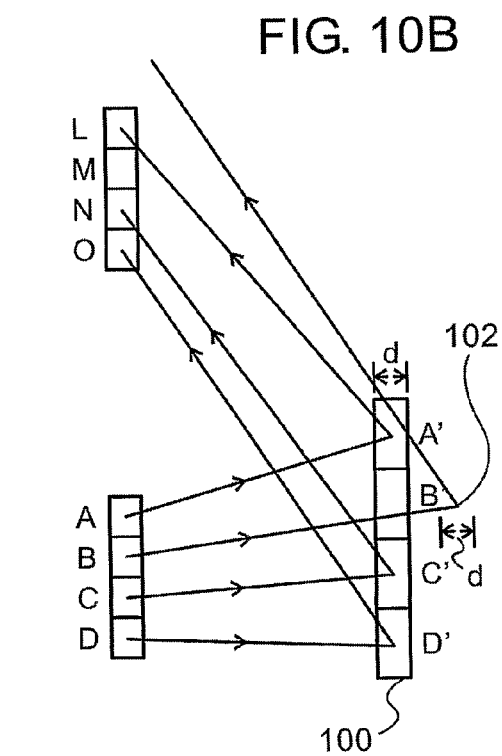
Figure 10C:
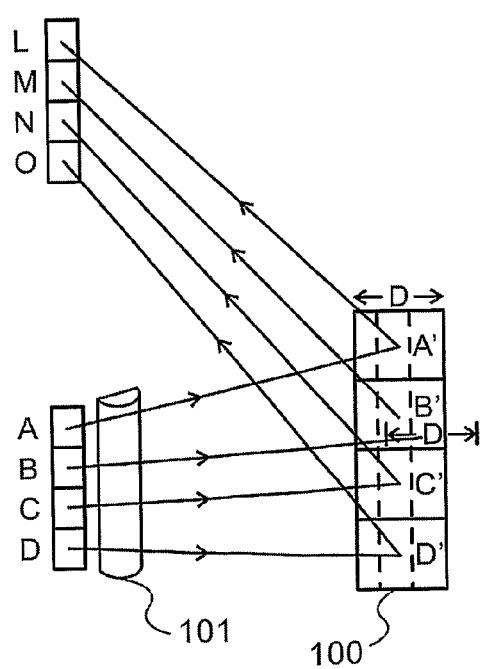

In any of the above described systems, the illuminating sources area assumed to be a precision linear array, each element directing its beam in an exactly aligned linear pattern. However, in real life situations, even if the sources are a precision array of laser sources, there may be minor misalignments between different sources, which may not direct their light into exactly the same linear pattern, resulting in a detection problem. Reference is now made to FIGS. 10A to 10C, which illustrate this effect and a method for overcoming it. FIG. 10A shows a simplified system with only four sources A, B, C and D, and four sensor pixels, L, M, N and O. In an ideal situation, each of the illumination beams hits any selected plane 100 along the beam fan in an exactly aligned linear orientation, in regions A', B', C' and D'. Any intrusion in these regions would result in changed reflections which are collected by the sensor array collimating optics, and are imaged by the sensor pixels, L, M, N, or O. The width of this collection area at the plane 100 is marked "d" in FIG. 10A, and for optimum optical efficiency, this should also be the width of the illumination beam at that plane.

In FIG. 10B on the other hand, one of the illumination sources B, is shown slightly misaligned, and directs its beam at a slightly different angle from the other correctly aligned sources. The beam impinges on the target plane 100 laterally offset by a certain distance, with the center of the beam at a position 102, which is sufficiently outside of the region B' that region B' does not receive any of its illumination beam, of width d. Since the pixel M only sees light reflected from the region B', the light reflected from an intruder at the spot 102 hit by the source B can no longer be detected by the pixel M of the sensor array.

FIG. 10C now shows a method by which this misalignment can be overcome. A lateral beam expansion device, such as a cylindrical lens 101 or a one-dimensional holographic diffuser plate, may be positioned in front of the illumination source array, such that each emitted beam is diverged in a horizontal direction, and illuminates an elongated patch of width D in the target plane area, where D is significantly larger than d. Although the pixel M collects light from no larger an area in the field, because of the elongated nature of the light impinging on the target plane, at least a part of that elongated illumination from B' is reflected by an intruder in plane 100 into the collection cone of pixel M, which does then correctly detect the light from source B. As an alternative to disposing the cylindrical lens in front of the source array to broaden the illumination at the imaged plane 100, a cylindrical lens can be disposed in front of the sensor array in order to broaden the width of the imaging collection cone of the pixels.

Figure 11A:
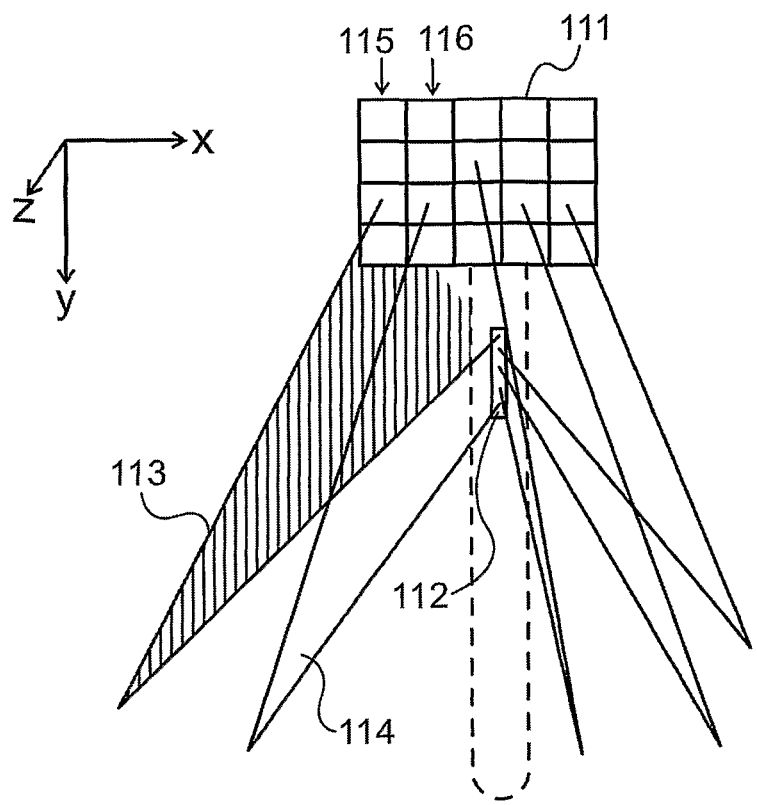
FIGS. 11A and 11B illustrate schematically an arrangement by which a three-dimensional scan can be performed using 2-dimensional source and detector arrays.

The systems so far described in the present disclosure are based on the use of a linear illuminating array aligned generally colinearly with, or at least parallel to, a linear detector array, to generate a narrow, two-dimensional curtain-like detection plane. Reference is now made to FIG. 11A which illustrates schematically a plan view of an arrangement by which a three-dimensional sensed area can be scanned using another adaption of the systems described in the present disclosure. A three-dimensional configuration may have advantages when trying to detect an intruder close to a static background object. The three-dimensional imaging ability is enabled by generating a scan of the intrusion detection plane in the direction perpendicular to that plane. FIG. 11A is a view of such a system, from the direction of the surveilled region, showing the narrow two-dimensional nature of a plane of detection 113. If a linear detector array is used on the fence pole, as in FIG. 2, coverage is only obtained in one plane perpendicular to the drawing, i.e. the x-y direction. As shown in FIG. 11A, a two-dimensional image sensor 111 may be used instead of a linear detector array, and the linear light source array 112 may then be scanned in the direction perpendicular to its array axis y, i.e. in the x-direction. This scanning can be accomplished either by rotating the linear array about its axis, or by using a scanning device such as a rotating prism or mirror. Alternatively, the array can generate a fan of beams by using a lateral expansion element, such as a cylindrical lens, but in this case, since the light is spread simultaneously over the entire detection region, the intensity and hence the detection sensitivity is reduced.

Figure 11B:
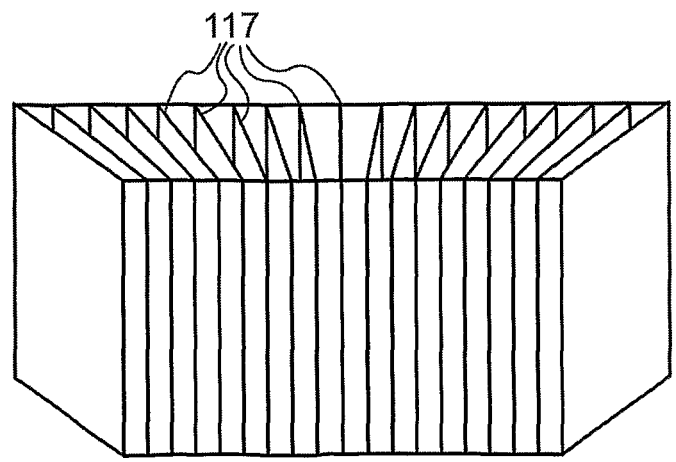

The light source array thus sequentially scans different planar fields of illumination through the x-direction. A three dimensional image can then be constructed of the entire field of view. Each different scanned direction represents a y-z plane which is imaged by the imaging lens onto a separate column of the two-dimensional imaging array 111. Thus, for instance, light directed into detection plane 113, which is selected when the illumination array 112 is aligned in its leftmost orientation, is imaged in the left-most column of pixels 115 of the detector array 111. Light directed into detection plane 114, is imaged in the next column of pixels 116 of the detector array 111. Scanning of the imaging plane in several angles through the x-direction generates a pattern which can be imaged in the two-dimensional area of the imaging array 111. This then enables generation of a three-dimensional representation of the surveilled zone. FIG. 11B is a schematic view of such a system, viewed into the direction of the surveilled region, showing the fan of surveilled planes 117 which together make up the three dimensional coverage area.

Figure 12:
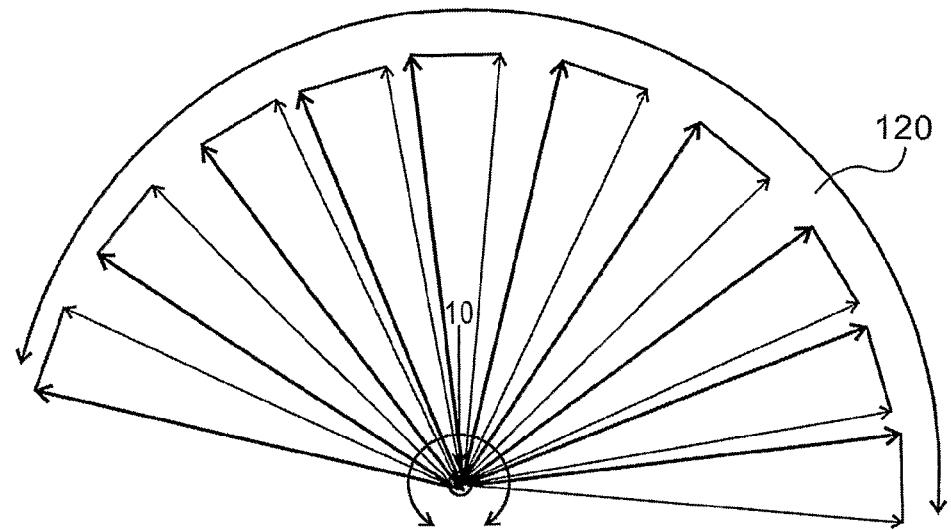
FIG. 12 illustrates schematically a method whereby a three-dimensional region can be surveilled by rotating the ODRS.

Reference is now made to FIG. 12, which illustrates schematically an alternative method whereby a three-dimensional region can be surveilled. The exemplary system of FIG. 12 uses an ODRS system with a line source and a line sensor array 10 of the type previously described. The entire system is rotated so that it scans sequentially different two-dimensional planes. If the angular rotational velocity is made sufficiently slow that the temporal scan of a single two-dimensional plane is completed before the system rotates more than the angular width W of the two-dimensional plane, neighboring scanned planes will overlap so that a continuous three-dimensional scanned volume 120 is created. Even a non-continuous scan may also be a useful configuration. In common with the previously described two-dimensional systems, this three-dimensional system can also eliminate background signals, calibrating itself by learning the position of the background reflections separately for every plane which it scans. Since for every scan plane surveilled, the system can measure the intruder distance, size, shape and type, these capabilities are also kept in this three-dimensional system. The system thus behaves like an optical radar system, surveilling a three-dimensional region with the same high detection ability as the two-dimensional systems described above.

A number of practical system design features are now discussed in relation to the parameters of the elements used in constructing systems of the present application. In the first place, it should be pointed out that the sensitivity of the CMOS line array used in the present systems is significantly higher than that of a two-dimensional CMOS array, as used in prior art video camera systems. This is a result of the circuit topography possible in a linear array which is impossible with a two-dimensional array. In a two-dimensional array there is little room for positioning the preamplifiers for each pixel in close proximity to the pixel, since the pixel is surrounded on all sides by its neighboring pixels. Therefore circuit compromises have to be made. In a linear array on the other hand, there is essentially boundless room on a microelectronic scale, on either side of the active areas in which to build preamplifiers without any area limitations. This is a further reason why the sensitivity of the current system is significantly higher than that of prior art video camera intrusion systems.

The light source may be a single mode VCSEL (Vertical Cavity Surface Emitting Laser) linear array of lasers, with each laser diode representing a single light source of the illumination fan. The array must be constructed with built in directing optics, or auxiliary external optics provided such that each laser is directed in a predetermined direction. It is possible to combine a number of VCSEL array modules in order to increase the light power or to increase the number of light signals propagate. A single mode array is generally advantageous but multi-mode arrays may also be used. The laser drive circuits must be programmed such that different laser diodes in the array emit at different points in time, and these drive circuits have to be synchronized in the control system with the sensor detection circuits, such that the signal from each pixel can be related to the particular beam from the laser which is being fired at the moment that signal is being detected.

Alternatively, an edge emitter laser diode array or an Individually Addressable Laser Diode Array may be used, each laser diode representing a single light source. As with the VCSEL array, different diodes are flashed serially in synchronization with the sensor detection circuits. The diodes can be integrated on a single chip or alternatively separate discrete diodes may be integrated onto a substrate.

If scanning configurations is used, then a single laser diode may be positioned in front of the scanning mechanism, which may be mechanical, a MEMS system or an electro-optic device such as an acousto-optic scanner.

Background light, generally solar background radiation, may be a major cause in limiting the signal-to-noise ratio of the detection system. In fact the background solar radiation when surveiling an area in daylight, may be orders of magnitude larger than the modulated signal reflected from the laser, which the system is trying to detect. Use of lasers having only a 1~2 nm bandwidth at 800 nm wavelength enables use of a bandpass optical filter matched to this narrow spectrum, which should be effective in filtering out solar background radiation, thereby increasing the signal to noise ratio. The narrower the width of the background noise filter, the better this solar radiation background noise can be overcome, and a filter passband of 0.5 nm. should provide sufficient selectivity to ensure reasonable system performance.

However, since it is difficult to define the central wavelength of the diode laser accurately, and, even more importantly, this central wavelength changes significantly with temperature and with ageing of the diode laser, it may be advantageous to use some sort of wavelength tracking mechanism to ensure that the filter stays tuned to the central wavelength of the laser diode.

Figure 13:
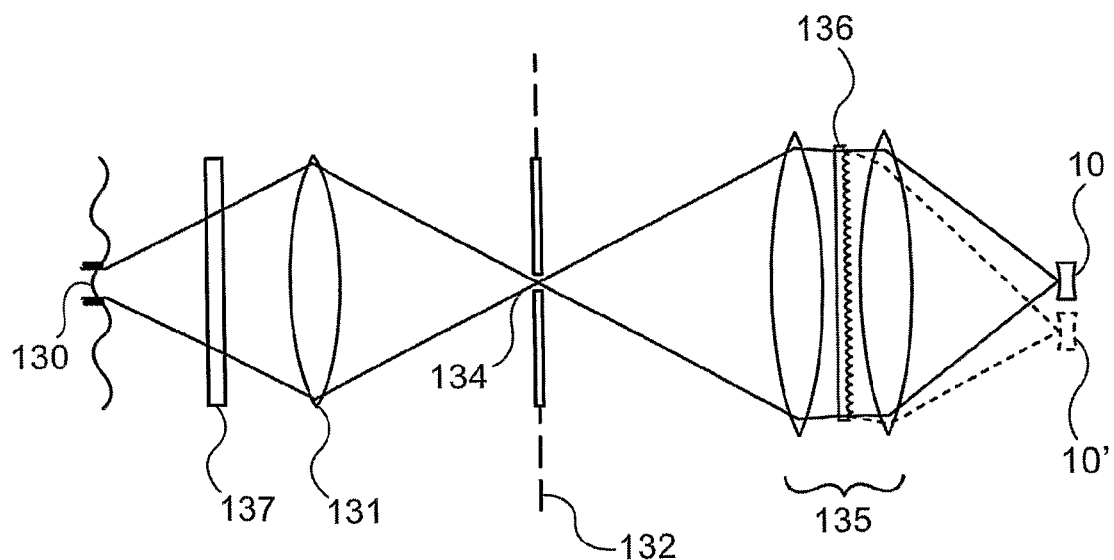
FIG. 13 illustrates schematically a plan view of an exemplary optical system, to enable dynamic tracking of changes in the illumination source wavelength to be achieved.

Reference is now made to FIG. 13, which illustrates a plan view of an exemplary optical system, use of which enables such dynamic tracking to be achieved. This tracking system utilizes a dispersive element which directs the received light to a spatial position according to its wavelength, and a movable detector array 10, which follows this position. In FIG. 13, a section 130 of the area being surveilled, reflects the modulated laser light back towards the detection system. An initial filtering step is accomplished by passband filter 137, in order to reduce the overall light level and the wavelength range which the detection system has to process. The filter 137 should be centered on the laser central wavelength and may have a passband of the order of 20 to 40 nm, such that even at its maximum drift from its centre frequency, the laser is still transmitted through the filter with minimum attenuation. At the image plane 132 of the objective lens 131, instead of positioning the detector array 10, as in the previously described implementations, a slit 130 is positioned. The intermediate image at this slit is projected by means of a relay lens 135 onto the detector array 10. A dispersive element 136, which may advantageously be positioned within the relay lens, then disperses the focused light onto the final image plane. Each different wavelength is focused at a slightly different position on this final image plane. In FIG. 13, two different wavelengths are shown by the full line falling on the detector array at position 10, and by the dashed line falling on the detector array at position 10'. The spatial position of the focused light on the final image plane thus moves with change in the wavelength of the laser diode. The diode array 10 can thus be provided with a linear motion mechanism with a feedback loop, as is known in the art, to ensure that the diode array is always moved to the position of maximum illumination. Thus, as the diode laser wavelength drifts, the detector array follows this drift and ensures maintenance of maximum detection sensitivity. Such a system may provide better discrimination than a wavelength stabilizing system applied to the laser diode itself.

The input filter 137, should have a sufficiently narrow passband in order to avoid mixing of different diffraction orders of the dispersive element from different regions of the spectrum, and it is this requirement which suggests a passband of no more than the order of 20 to 40 nm. Furthermore, in order to avoid losing light to higher orders, a blazed grating or a Dammann grating may advantageously be used as the dispersive element 136.

Additionally, the use of a pulsed light source with short pulses allows a reduction of the sensor integration time and hence a reduction in the amount of collected background light. For a system having a maximum range of the order of 200 meters, a 100 element array with 0.25 mm pitch and 15μ emitter diameter should be suitable. Using an F/10 objective lens having a focal length of 1000 mm, at the 200 meter range, the spacing between the areas illuminated by the lasers becomes 5 cm. The detector may advantageously be a Fairchild CMOS 1421 linear array, having 2048 pixels. If 500 pixels are usefully used, using an F/3.5 lens with 140 mm focal length will result in a pixel size of 1 cm at the maximum range.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

We claim:

1. A system for detecting intrusion, said system comprising:
   an illumination source projecting an array of illuminating beams distinguished by beam identifying features, along different optical paths;
   a detector array comprising elements detecting reflected illumination received in an array of fields of view, said reflected illumination originating from said array of illuminating beams, and said elements using d beam identify features to determine from which of said illuminating beams said reflected illumination originates; and
   a signal processing system adapted to detect changes in the reflected illumination levels detected by said elements of said detector array,
   wherein an increase greater than a first predefined level; in said reflected illumination from a first field of view associated with a first element, provides an indication of the spatial position of said intrusion at the crossing point of:
   (a) said first field of view associated d with said first element, with
   (b) that optical path whose illuminating beam generates said increase in reflected illumination detected by said first element.

2. A system according to claim 1, wherein the spatial position of said crossing point at which an increase in said reflected illumination is detected is known by determining both said beam identifying feature of said reflected illumination detected and the field of view in which said change is detected.

3. A system according to claim 1, wherein said beam identifying feature is any one of:
   (i) the point in time at which said illuminating beam is projected along one of said different optical paths;
   (ii) a modulation feature applied differently to illuminating beams projected along different optical paths;

(iii) the wavelengths of said illuminating beams projected along different optical paths; and (iv) the nature of the polarization of said illuminating beams projected along different optical paths.

4. A system according to claim 1, wherein said array of illuminating beams is aligned generally collinearly with said array of fields of view, such that said system provides said indication of an intrusion across a curtain-like detection plane containing said array of illuminating beams and said array of fields of view.

5. A system according to claim 1, wherein said array of illuminating beams is either (a) a plurality of parallel beams or (b) a plurality of angularly diverging beams.

6. A system according to claim 5, wherein said plurality of angularly diverging beams is projected from a single source whose beam is angularly scanned.

7. A system according to claim 1, wherein said array of illuminating beams are projected along different paths in a predetermined sequence, and said changes in the light level detected by said detector system are changes determined between successive sequences.

8. A system according to claim 1, further comprising at least one focusing element disposed to direct light reflected from different fields of view into elements of said detector system.

9. A system according to claim 1, wherein said illumination source comprises either (1) a plurality of light sources each projecting its own illuminating beam, or (2) a single source whose output is scanned angularly to generate said array of illuminating beams.

10. A system according to claim 1, and wherein said signal processing system is further adapted to detect a decrease larger than a second predetermined level in said illumination reflected from a second field of view, essentially simultaneously with said increase greater than said first predetermined level in said illumination reflected from said first field of view, such that said combination of said increase and said decrease in said reflected illumination beams provides an indication of the spatial position of an intrusion at the crossing point of said first field of view with said path whose reflected illumination shows said increase.

11. A system according to claim 1, wherein said system is rotated angularly such that it provides an indication of the spatial position of an intrusion in a plurality of directions of fields of view.

12. A system according to claim 11, and wherein said system provides three dimensional information regarding the location of said intrusion.

13. A system according to claim 1, wherein said illumination source projecting an array of illuminating beams is scanned in a direction generally perpendicular to said direction of projection of said array of illuminating beams, and said detector array is a two dimensional detector array directed such that different columns of said detector array detect said array of illuminating beams reflected from fields of view in directions generally perpendicular to said direction of said array of illuminating beams.

14. A system according to claim 1, wherein said signal processing system further comprises a computing module which time-sequentially determines the outputs from said elements of said detector array at a plurality of predetermined time intervals, such that a profile of a moving intruding object is generated by said time-sequentially determined outputs.

15. A method for detecting intrusion, said method comprising:

projecting an array of illuminating beams distinguished by beam identifying features along a plurality of optical paths;

detecting reflected illumination received in an array of fields of view, said reflected illumination originating from said illumination projected along said plurality of optical paths, the intersection of (a) said plurality of optical paths with (b) said array of fields of view defining crossing points;

using said beam identifying features to determine from which of said illuminating beams said reflected illumination originates; and detecting changes in the reflected illumination levels detected in said array of fields of view, wherein an increase greater than a first predetermined level in said reflected illumination originating from any of said crossing points provides an indication of the spatial position of an intrusion at said crossing point.

16. A method according to claim 15, wherein the spatial position of a crossing point at which an increase in said reflected illumination is revealed is known by determining both the beam identifying feature of the reflected illumination detected and the field of view in which said change is detected.

17. A method according to claim 15, wherein said beam identifying feature is any one of:

(i) the point in time at which illumination is projected along one of said plurality of optical paths;

(ii) a modulation feature applied differently to illumination projected along different ones of said plurality of optical paths;

(iii) the wavelength of said illumination projected along different ones of said plurality of optical paths; and (iv) the nature of the polarization of said illumination projected along different ones of said plurality of optical paths.

18. A method according to claim 15, wherein said plurality of optical paths are distinguished either laterally or angularly.

19. A method according to claim 15, wherein said illumination projected along different paths originates from either one of a plurality of sources or a single angularly scanned source.

20. A method according to claim 15, further comprising the step of aligning said plurality of optical paths generally collinearly with said array of fields of view, such that said method provides said indication of an intrusion across a curtain-like detection plane containing said plurality of optical paths and said array of fields of view.

21. A method according to claim 15, wherein said crossing points are predefined to eliminate regions where spurious signals are expected.

22. A method according to claim 15, wherein each of said fields of view is distinguished by means of detector elements adapted to detect illumination originating from said array of fields of view, and said crossing point from which said reflected illumination originates is determined by knowledge of which of said detector elements is associated with said field of view and which of said array of illuminating beams gives rise to said increased reflected illumination detected by said detector element.

23. A method according to claim 15, further comprising the step of determining a decrease larger than a second predetermined level, of reflected illumination originating from another of said crossing points, essentially simultaneously with said increase above a first predetermined level in said reflected illumination originating from said first crossing point, wherein said combination of said increase and said decrease in said reflected illumination provides an indication of a suspected intrusion across said surface at said crossing point where said increase in said reflected illumination is determined.

24. A method according to claim 15, further comprising the step of angularly rotating said plurality of optical paths such that it provides an indication of an intrusion in a plurality of directions of fields of view.

25. A method according to claim 24, said method providing three dimensional information regarding the location of said intrusion.

26. A method according to claim 15, further comprising the step of scanning said illumination projected along a plurality of optical paths in a direction generally perpendicular to said direction of said plurality of optical paths, such that said illumination reflected from said array of fields of view is detected in two dimensions.

27. A method according to claim 15, further comprising the steps of:
  determining the outputs from the elements of said detector array;
  repeating said determining at a plurality of predetermined time intervals; and
  generating from said repeated determinations a profile of a moving intruding object.

28. A method according to claim 27 wherein said determining of the outputs utilizes output levels above a predetermined threshold level.

29. A system for detecting intrusion, said system comprising:
  at least one source projecting an array of illuminating beams along different optical paths;
  a detector system directed such that it detects in a field of view, illumination reflected from said illuminating beams; and
  a signal processing system adapted to detect changes in said field of view, of the reflected illumination level detected by said detector system,
  wherein an increase greater than a predefined level detected in said reflected illumination level from said field of view provides an indication of the spatial position of an intrusion in said field of view, at the crossing point of said field of view with said optical path whose reflected illumination shows said increase.

30. A system according to claim 14, wherein said computing module utilizes output levels above a predetermined threshold level.

* * * * *